Feb. 27, 1968   P. S. HOPPER   3,370,646
ANTI-FOULING SYSTEM
Filed Jan. 21, 1966
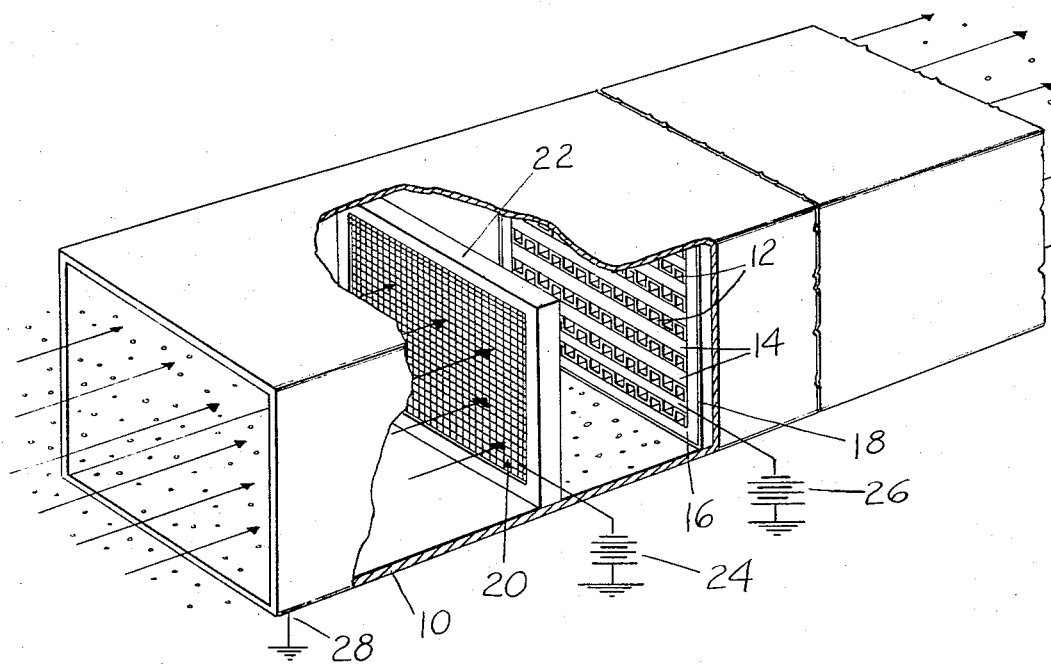
INVENTOR
PHILIP S. HOPPER
BY Fishman + Van Kirk
ATTORNEYS 3,370,646
ANTI-FOULING SYSTEM
Philip S. Hopper, Manchester, Conn., assignor to United Aircraft Corporation, East Hartford, Conn., a corporation of Delaware
Filed Jan. 21, 1966, Ser. No. 522,316
1 Claim. (Cl. 165—95)

ABSTRACT OF THE DISCLOSURE

An anti-fouling system for heat exchangers wherein contaminate matter in a heat exchange fluid is ionized and retained in suspension in the fluid passing through the heat exchanger. The heat exchanger tubes are electrically charged to produce a field which repels the ionized contaminates from the walls of the heat exchanger.

---

This invention relates to the prevention of the accumulation of matter on the interior surfaces of tubular members. More particularly, this invention is directed to an anti-fouling system for tubular members through which contaminated fluids are directed. Accordingly, the general objects of this invention are to provide new and improved methods and apparatus of such character.

While not limited thereto in its utility, this invention is particularly well suited for use with a heat exchanger and thus will be described in such an environment. As is well known, a heat exchanger, in its most basic form, ordinarily comprises two independent fluid flow paths separated by a wall through which heat flows from one fluid to the other. In actual practice, heat exchangers usually are comprised of bundles of tubular members through which a first fluid is directed. By proper construction and location of the other elements of the heat exchanger, thermal energy may be added to or removed from the first fluid as it flows through the bundle of tubular members. The details of such other elements, whether they consist of provision for parallel or counter flowing fluids or electrical or mechanical heat sources or heat sinks, are not part of this invention and thus will not be described herein.

Clogging or fouling problems have long plagued the heat exchanger art. For example, considering a regenerative type gas turbine engine wherein it is desired to cool the exhaust stream, the fluid (exhaust gas) flowing through the heat exchanger tubes will contain suspended particles of carbon, dirt and oil droplets. Accumulation of these dirt and carbon particles and oil droplets on the walls of the tubular members which comprise the exchanger will, in due time, cause clogging of some of the members or, at the very least, will reduce their internal diameter and thus reduce the efficiency of the apparatus.

Various schemes including mechanical filtering have been employed in an attempt to reduce these clogging problems. However, to date these prior art schemes have met with but limited success. A major reason for this lack of success in solving the problem of heat exchanger fouling, particularly where the fluid being cooled or heated is a high velocity gas, is that prior art mechanical filters choke the gas flow.

This invention overcomes the above mentioned disadvantages by providing a novel anti-fouling system for heat exchangers or other tubular members through which fluids are directed.

It is therefore an object of this invention to prevent disposition of contaminates on the walls of tubular members through which fluids are flowing.

The foregoing and other objects and advantages of this invention are accomplished by imparting a first polarity charge to contaminative particles prior to their entry into a tubular member with the carrier stream flowing therethrough. A potential of the same polarity as that imparted to the contaminative particles is applied to the walls of the tubular member thus establishing a repelling electrostatic field within the tubular members. The electrostatic field thus holds the particles in suspension in the carrier stream as it passes through the tubular member.

This invention may be better understood and numerous other objects and advantages thereof will become apparent to those skilled in the art by reference to the accompanying drawing.

In the drawing, conduit 10 comprises part of a heat exchanger assembly. Disposed within conduit 10 and insulated therefrom are a plurality of corrugated metallic plates 12. Plates 12 cooperate with metallic spacers 14 to define fluid flow passages. The spacers and corrugated members are held in position by a metallic frame 16. In order to provide the aforementioned insulation between the fluid passage defining means and conduit 10, frame 16 may be coated with an insulating material, preferably a ceramic, by a technique such as flame or plasma spraying. The insulating coating 18 will be capable of withstanding high temperatures and have good heat transfer characteristics. Thus, beryllia (beryllium oxide) would be a suitable material for coating 18.

Positioned in conduit 10, upstream in the direction of fluid flow from the passages defined by members 12 and 14, is a grid structure indicated generally at 20. Grid 20 comprises a plurality of wires or electrodes mounted within a frame 22 of insulating material. The wires or electrodes of grid 20 are disposed in a plane or, in the usual instance, a series of planes perpendicular to the direction of gas flow into conduit 10. The individual wires of grid 20 are of relatively small diameter and thus the presence of the grid in the fluid stream has little effect upon the fluid flow.

A high voltage source 24 has its negative terminal connected to the wires which comprise grid 20. The positive terminal of source 34 is grounded. The potential applied to grid 20 from source 24 will establish a strong electrical field in the vicinity of the grid.

A second direct current source 26 has its negative terminal connected to members 12 and 14. The potential applied to the walls of the fluid flow passages from source 26 establishes an electrostatic field within each of the passages.

A contaminated fluid, for example air containing suspended carbon and dirt and oil droplets, enters the mouth of conduit 10 and passes through grid 20. In passing through grid 20, because of the high field strength in this region, the droplets and particles will acquire a negative charge. That is, as the fluid passes through the powerful electric field created by the potential applied to grid 20, the fluid is ionized. The ions in turn charge the suspended particles and droplets by contact. The ionized fluid and charged particles and droplets then pass through the passageways defined by members 12 and 14. Because of the potential applied to the walls of these passages, the charged particles are repelled therefrom (i.e., a repelling electrostatic field of the same polarity as the charged particles is created) and the contaminative matter thus pass out through the downstream end of the fluid flow passageways rather than collecting on the walls thereof. While passing through the fluid flow passageways, heat is added to or taken from the fluid in the manner well known in the art.

It should be noted that, while a negative potential has been shown applied to grid 20 and the walls of the heat exchanger fluid passageways, it is possible to apply positive potentials to both elements. The negative potential is often preferred because the negative corona discharge permits higher voltages and currents to be carried. However, it may be desirable to employ positive potentials since, in the case where the fluid flowing through the apparatus is air, there will be less ozone generation. It is also to be noted that conduit 10 is grounded at 28. Grounding of the walls of conduit 10 is, of course, dictated by safety requirements.

While a preferred embodiment has been shown and described, various modifications and substitutions may be made without departing from the spirit and scope of this invention. Accordingly, it is to be understood that this invention has been described by way of illustration rather than limitation.

What is claimed is:
1. Heat exchanger apparatus comprising:
    a conduit;
    a heat exchanger positioned within said conduit having a plurality of parallel fluid flow passages through which heat exchange fluids flow, at least one of said passages being parallel to the axis of said conduit;
    said heat exchanger having walls electrically insulated from said conduit;
    means positioned in said conduit and upstream in direction of gas flow from said heat exchanger for establishing an ionizing electrostatic field in said conduit;
    means applying a direct current potential to said field establishing means whereby a fluid flowing through said conduit is ionized and contaminative matter entrained in the fluid will be caused to assume a first polarity charge; and
    means for applying a potential having the same polarity as that imparted to the contaminative matter to said heat exchanger whereby said matter will be repelled from the walls of said heat exchanger and will remain suspended in the fluid which passes therethrough.

References Cited
UNITED STATES PATENTS

| | | | |
|---|---|---|---|
| 2,490,979 | 12/1949 | Palmer | 55—138 X |
| 2,604,936 | 7/1952 | Kaehni et al. | |
| 2,763,125 | 9/1956 | Kadusch et al. | |
| 3,184,901 | 5/1965 | Main | 55—138 X |
| 3,218,781 | 11/1965 | Allemann et al. | 55—138 X |

ROBERT A. O'LEARY, *Primary Examiner.*

T. W. STREULE, *Assistant Examiner.*